US 6,644,871 B2

(12) United States Patent
Nakatani

(10) Patent No.: US 6,644,871 B2
(45) Date of Patent: Nov. 11, 2003

(54) PAN HEAD

(75) Inventor: Kouichiro Nakatani, Tokyo (JP)

(73) Assignee: Nihon Velbon Seiko Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/111,565

(22) PCT Filed: Apr. 24, 2001

(86) PCT No.: PCT/JP01/03493
§ 371 (c)(1),
(2), (4) Date: Apr. 26, 2002

(87) PCT Pub. No.: WO02/19026
PCT Pub. Date: Mar. 7, 2002

(65) Prior Publication Data
US 2003/0012571 A1 Jan. 16, 2003

(30) Foreign Application Priority Data
Aug. 29, 2000 (JP) ........................................ 2000-259815

(51) Int. Cl.[7] .............................................. G03B 17/00
(52) U.S. Cl. ..................................... 396/428; 248/187.1
(58) Field of Search ................................. 396/428, 419; 248/187.1; 348/143, 158

(56) References Cited

U.S. PATENT DOCUMENTS 4,457,610 A * 7/1984 Kawazoe ..................... 396/428
D303,269 S * 9/1989 Yamaguchi ................ D16/245
5,365,293 A * 11/1994 Nakatani ..................... 396/428
6,203,216 B1 * 3/2001 Koizumi ..................... 396/427

FOREIGN PATENT DOCUMENTS

JP          60-38995         3/1985
JP          60-150397        10/1985

* cited by examiner

Primary Examiner—Russell Adams
Assistant Examiner—Michael Dalakis
(74) Attorney, Agent, or Firm—Morrison & Foerster LLP

(57) ABSTRACT

A panhead (11) has a base body (20), a tilting body (21), and a camera mount (41). The base body (20) is adapted to be connected to a leg system 12. The tilting body (21) can be adjustably rotated around a rotation center axis (X) that horizontally extends in the lateral direction. The camera mount (41) can be adjustably rotated around a rotation center axis (A) that horizontally extends in the fore-and-aft direction and coincides with the axial direction of a side-tilting shaft. The rotation center axis (A) of the camera mount (41) approximately coincides with a lateral-dimension-bisecting line (B) of the base body (20) as viewed from the top. The side-tilting shaft is disposed approximately below a camera fixing screw (59) of the camera mount (41).

5 Claims, 8 Drawing Sheets

PRIOR ART

PAN HEAD

TECHNICAL FIELD

The present invention relates to a panhead to be used in the state where it is attached to a leg system, such as a tripod for a camera.

BACKGROUND OF THE INVENTION

Examples of conventional panheads are respectively shown in FIGS. 7 and 8.

The panhead shown in FIG. 7 includes a base body 1, a tilting body 2 and a camera mount 4. The tilting body 2 is mounted on the base body 1 in such a way that the tilting body 2 can be adjustably rotated. The camera mount 4 is supported by a side-tilting shaft 3 of the tilting body 2. A screw 6 having a head 5 with a diameter larger than the remaining part of the screw 6 is attached to the camera mount 4.

A camera (not shown) can be attached to the camera mount 4 of the panhead shown in FIG. 7 by inserting a hand into a space 7 between the top of the base body 1 and the underside of the camera mount 4 and holding the head 5 of the screw 6, so as to screw the furthermost end of the screw 6 into a screw hole formed in the back of the camera.

The panhead shown in FIG. 8 includes a base body 1, a tilting body 2 and a camera mount 4a of a quick-shoe type. The tilting body 2 is mounted on the base body 1 in such a way that the tilting body 2 can be adjustably rotated. The camera mount 4a is supported by a side-tilting shaft 3 of the tilting body 2.

According to the structure of the panhead shown in FIG. 8, a camera 10 can be attached to the panhead by fixing a camera securing member 4b, which has been removed from the camera mount 4a for the moment, to the back of the camera 10, and then attaching the camera securing member 4b back to the camera mount 4a. Thus, the camera 10 can be attached to the camera mount 4a with a minimal operation. There is a considerably large space 7a in the panhead shown in FIG. 8, because no particular member is provided between the base body 1 and the camera mount 4a. However, this space 7a is not utilized at all.

The panheads shown in FIG. 7 and FIG. 8 are both capable of setting the camera mount 4, 4a at a left-side tilting position. However, neither panhead is capable of setting the camera mount 4, 4a at a right-side tilting position due to obstruction of the base body 1 by the camera mount 4, 4a.

An example of conventionally known panheads to solve the above problem has a structure shown in FIG. 9.

The panhead shown in FIG. 9 includes a base body 1, a tilting body 2 and a camera mount 4. The tilting body 2 is mounted on the base body 1 in such a way that the tilting body 2 can be adjustably rotated. The camera mount 4 is supported by a side-tilting shaft 3, which projects forward from a support plate portion 2a of the tilting body 2. A screw 6 having a head 5 with a diameter larger than the remaining part of the screw 6 is attached to the camera mount 4. A side-tilting operating handle 8 to be used for side-tilting is also attached to the camera mount 4.

The camera mount 4 of the panhead shown in FIG. 9 can be set at a right-side tilting position or a left-side tilting position by appropriately operating the side-tilting operating handle 8 which is set in a handle-mounting hole 9 formed to accommodate it.

As the camera mount 4 is attached to the side-tilting shaft 3, which is formed on the front face of the support plate portion 2a of the tilting body 2 and horizontally extends therefrom in the forward direction, there is no space in the upper front part of the panhead. Therefore, the panhead shown in FIG. 9 presents a problem in that it cannot be made sufficiently compact when being carried or other instances of non-use.

In order to solve the above problems, an object of the present invention is to provide a panhead that can be made sufficiently compact when being carried or other instances of non-use, and also permits its camera mount to be set at either the right-side tilting position or the left-side tilting position as desired.

DISCLOSURE OF THE INVENTION

A panhead according to the present invention includes a camera mount provided with a camera fixing screw on the top thereof, and a side-tilting shaft disposed approximately below said camera fixing screw of the camera mount, wherein the camera mount is supported by the side-tilting shaft so that the camera mount can be set at either the left-side tilting position or the right-side tilting position by being adjustably rotated around the side-tilting shaft.

As the invention calls for disposing the side-tilting shaft approximately below the camera fixing screw of the camera mount, a space is provided in the upper front part of the panhead. Therefore, the panhead can be made sufficiently compact when being carried or other instances of non-use, and also permits its camera mount to be set at either the right-side tilting position or the left-side tilting position as desired.

A panhead according to another feature of the present invention includes a base body to be connected to a leg system, a rotational body which is provided as a part of the base body and can be adjustably rotated around a horizontal rotation center axis extending in the lateral direction, a side-tilting shaft which is provided as a part of said rotational body and adapted to rotate in an integral body with said rotational body, and a camera mount which is attached to the side-tilting shaft and provided with a camera fixing screw at the top thereof, said camera mount adapted to be adjustably rotated around a rotational center axis that horizontally extends in the fore-and-aft direction and coincides with the axial direction of the side-tilting shaft, wherein the camera mount is arranged such that its rotation center axis mentioned above is located on or close to a vertical surface that passes the center of the lateral length of said base body and that the camera mount can be set at the left-side tilting position or the right-side tilting position by being adjustably rotated, and wherein said side-tilting shaft is disposed approximately below the camera fixing screw of the camera mount.

As the side-tilting shaft is disposed approximately below the camera fixing screw of the camera mount, a space is provided in the upper front part of the panhead. Therefore, the panhead can be made sufficiently compact when being carried or other instances of non-use, and also permits its camera mount to be set at either the right-side tilting position or the left-side tilting position as desired.

A panhead according to yet another feature of the present invention includes a side-tilt locking knob which extends coaxially with the side-tilting shaft and is capable of advancing or retreating with respect to the side-tilting shaft, and a stopper adapted to function such that when the side-tilt locking knob is at the advanced position the stopper is pressed against the camera mount so as to prevent rotation of the camera mount, and when the side-tilt locking knob is at the retreated position the stopper is released from the camera mount so as to permit rotation of the camera mount.

As the position of the camera mount can be changed by causing the side-tilt locking knob to advance or retreat, the panhead according to the invention is convenient to operate. Furthermore, as the side-tilt locking knob is disposed coaxially with the side-tilting shaft, the panhead can be made appropriately compact.

According to yet another feature of the present invention, the axial length of the side-tilting shaft of the panhead is nearly equal to the front-to-back dimension of the camera mount, and a shaft fitting portion fitted to the side-tilting shaft is formed at the underside of the camera mount.

As the camera mount can easily be attached to the side-tilting shaft by fitting the shaft fitting portion to the side-tilting shaft, the invention provides a panhead that is convenient to assemble.

PREFERRED EMBODIMENT OF THE INVENTION

Figure 1:
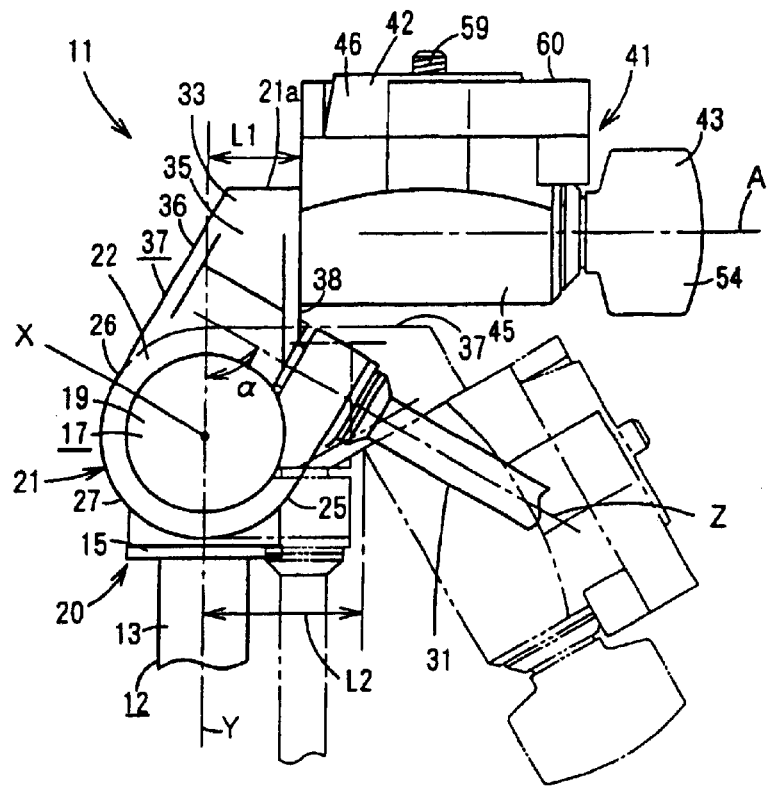
FIG. 1 is a side view of an embodiment of a panhead according to the present invention.

Next, the structure of an embodiment of a panhead according to the present invention is explained hereunder, referring to the relevant drawings.

FIGS. 1 through 5 show the entire panhead 11 in the home position. The panhead 11 is intended to be mounted on, for example, a panhead mounting portion 13 formed on the top of a leg system 12, such as a camera tripod or the like, so as to secure the camera, which is not shown in the drawings. The function of the panhead 11 permits the camera lens to be positioned in any desired orientation vertically or laterally in accordance with the position of the subject to be photographed while the leg system 12 is kept fixed.

Figure 5:
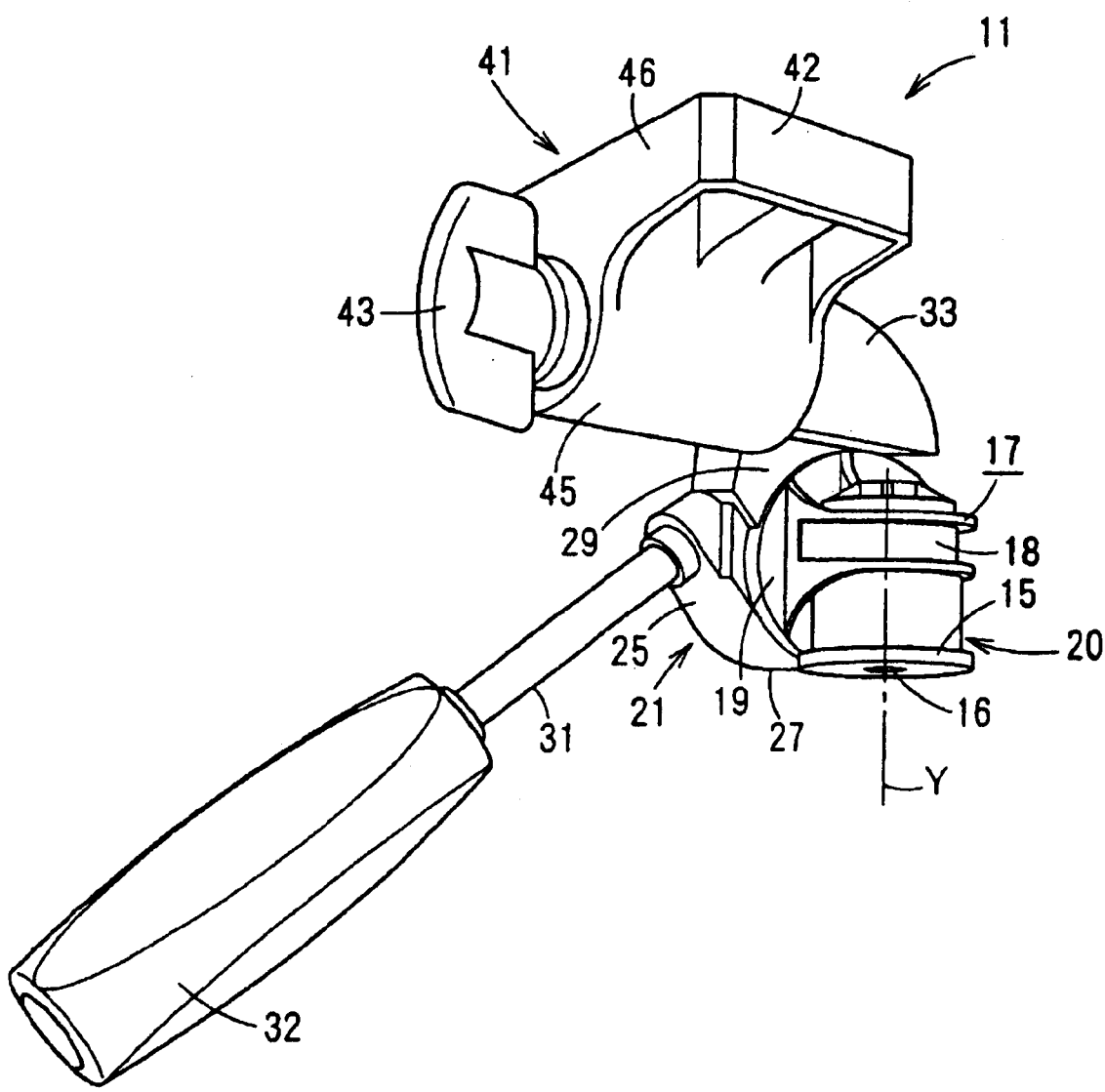
FIG. 5 is a perspective of said panhead viewed diagonally from the rear.

As shown in FIG. 5, the panhead 11 includes a leg connecting member 15 having a column-like shape with its bottom having a greater diameter. A threaded hole 16 serving as a connecting hole is formed in the bottom of the leg connecting member 15. A male screw (not shown) of panhead mounting portion 13 of the leg system 12 is screwed in the threaded hole 16. A panning body 17 serving as a rotational body is provided around the cylindrical outer surface of the panning shaft portion (not shown) of the leg connecting member 15 in such a manner that the panning body 17 can be adjustably rotated around the rotation center axis Y, which extends vertically, in other words along an imaginary line that coincides with the center axis of the panning shaft portion (not shown).

A cylindrical connector portion 18 open at the bottom is formed at one side (the right side) of the panning body 17 and fitted around the panning shaft portion (not shown). Thus, the connector portion 18 is rotatably connected to the panning shaft portion. Another connector portion 19, which may be a tilting shaft portion having a column-like shape, is formed at the other side (the left side) of the panning body 17. A tilting body 21 serving as another rotational body is fitted around the cylindrical outer surface of the connector portion 19 in such a manner that the tilting body 21 can be adjustably rotated around the rotation center axis X, which extends laterally, in other words along an imaginary horizontal line that coincides with the center axis of the connector portion 19. The panning body 17 and the leg connecting member 15 together constitute a base body 20, to which the upper end portion of the leg system 12 is removably connected.

Figure 2:
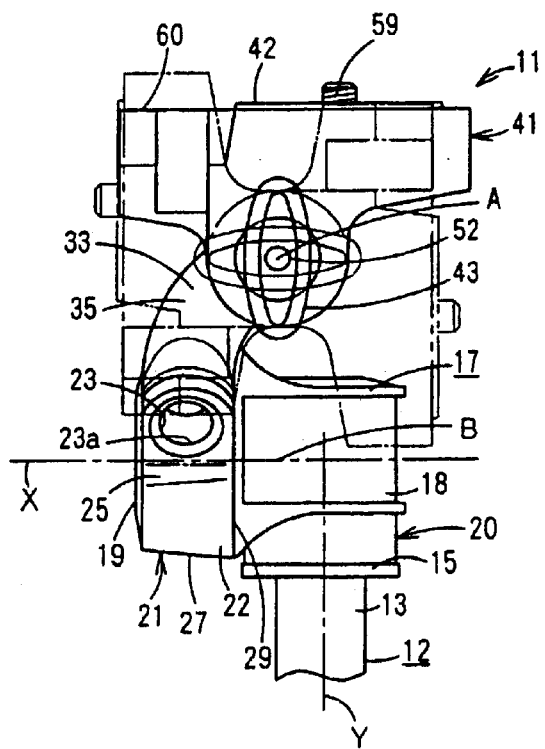
FIG. 2 is a rear view of said panhead.

The tilting body 21 has a generally cylindrical body portion 22, which is rotatably fitted around the surface of the connector portion 19 of the panning body 17. The bottom of the body portion 22 is formed in an arc shape. A generally cylindrical handle connecting hole 23 open at both ends is bored through the upper end portion of the body portion 22. As shown in FIG. 2, one of the openings of the handle connecting hole 23, i.e. the opening 23a, opens in the upper part of one of the flat surfaces of the body portion 22, i.e. the rear face 25, in such a way that the opening 23a faces rearward with respect to the panhead 11, in a downwardly inclined direction. The opening 23b of the handle connecting hole 23 opens in the upper part of the other flat surface of the body portion 22, i.e. the front face 26 located opposite the rear face 25 in such a way that the opening 23b faces forward with respect to the panhead 11, in an upwardly inclined direction. The body portion 22 is formed such that the bottom edges of its front and rear faces 26, 25 extend parallel to each other until they respectively connect to the two opposing edges of the bottom end face 27 as an integral, contiguous body therewith. Said bottom end face 27 of the body portion 22 is formed in a curved surface in the shape of a half arc.

A panning handle 31 serving as an operating handle is rotatably connected to the body portion 22, with the base end portion, i.e. the upper end portion, of the panning handle 31 inserted in the handle connecting hole 23. The remaining part of the panning handle 31 (the entire panning handle except for the base end portion) projects from the rear face 25 of the tilting body 21 in a given direction, i.e. rearward with respect to the panhead that is in the home position, at a downwardly inclined direction.

The panning handle 31 is formed in the shape of a long bar having a circular section and extending in such a direction as to intersect with the rotation center axis X of the tilting body 21. A holder member 32 is fixed to the lower end portion, i.e. the end located opposite the base end, of the panning handle 31.

By rotating the panning handle 31 on the axis of the panning handle 31 while holding the holder member 32, the tilting body 21 can be fixed to or disengaged from the panning body 17.

By operating the panning handle 31 while holding the holder member 32 so that the furthermost end of the panning handle 31 moves vertically and laterally around the base end, it is possible to rotate the tilting body 21 upward or downward, as well as forward or backward, around the rotation center axis X, while horizontally rotating the panning body 17 around the rotation center axis Y together with the tilting body 21.

As shown in FIG. 2, the tilting body 21 has a projecting portion 33, which is formed integrally with the body portion 22. The projecting portion 33 projects upward from the upper part of the body portion 22, in other words the vicinity of the handle connecting hole 23 of the body portion 22, and sideways from one side of the body portion 22, i.e. the right side 29, towards the right side of the panhead 11.

Figure 3:
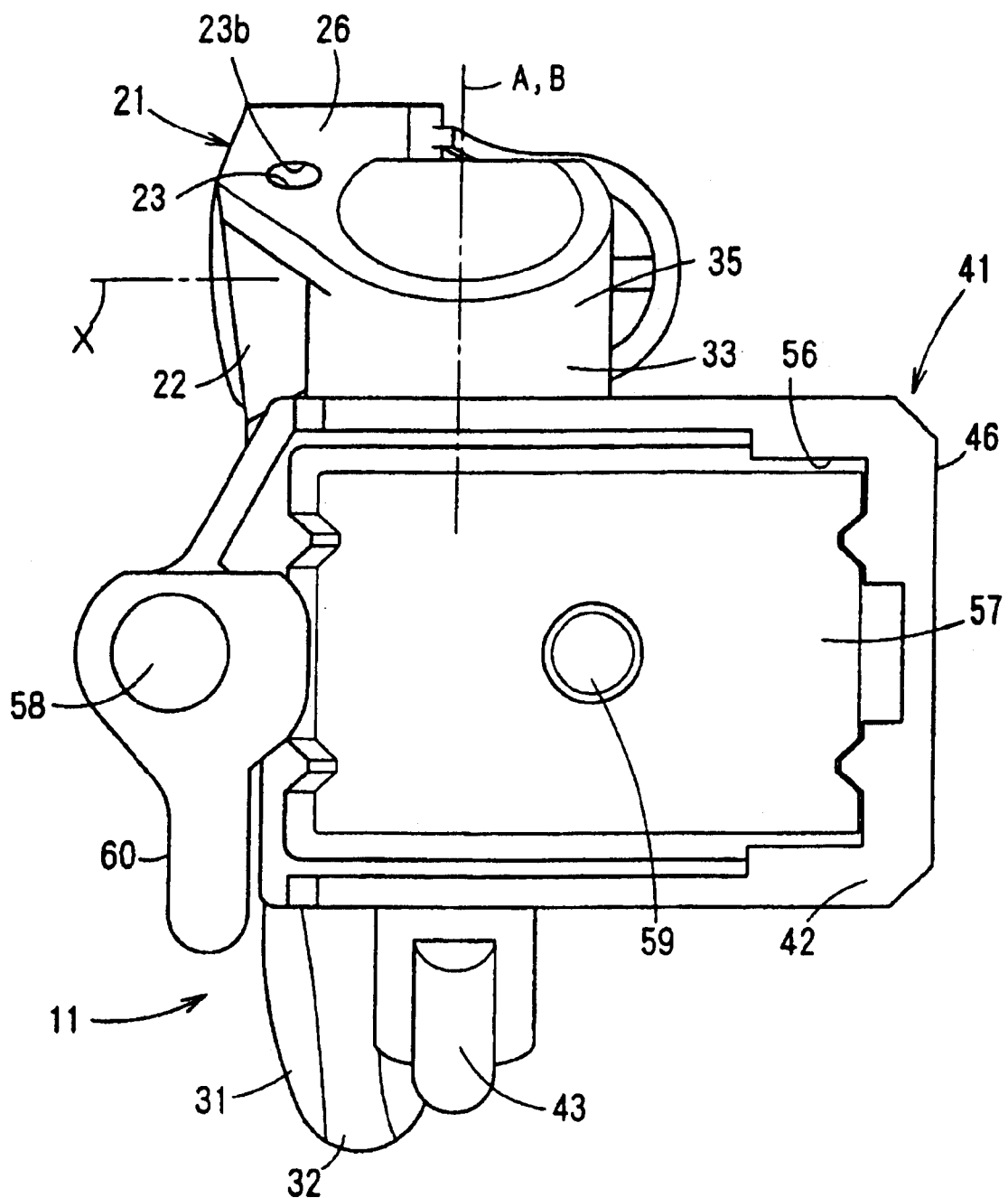
FIG. 3 is a plan view of said panhead.
Figure 4:
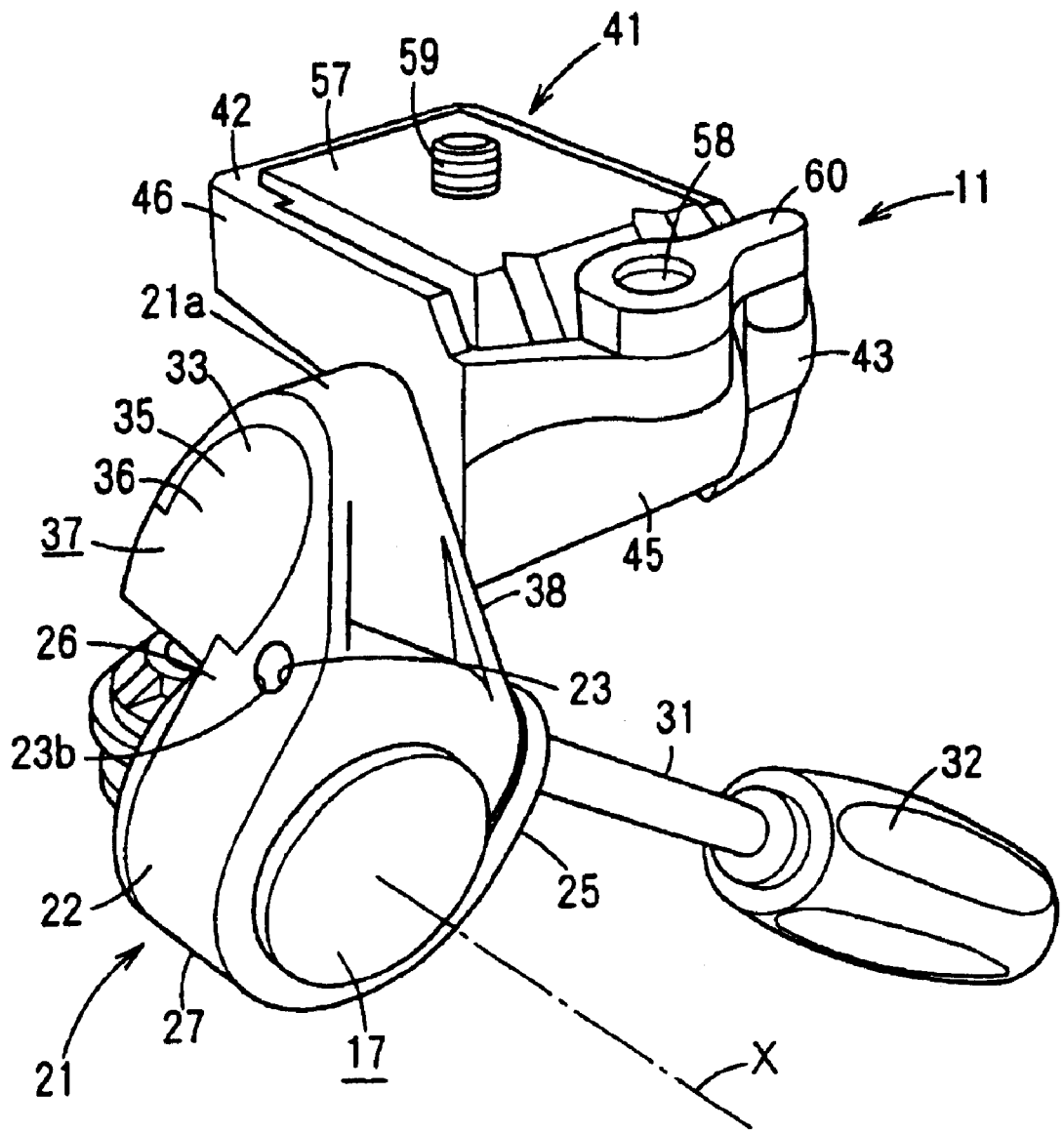
FIG. 4 is a perspective of said panhead viewed diagonally from the front.

As shown in FIGS. 3 and 4, the projecting portion 33 has a connector portion 35 having a shape resembling a short, truncated cylinder so that its cross section consists of an arc and a horizontally extending base. One of the lengthwise ends of the connector portion 35 is formed into a slanted surface 36, which is gradually angled from the top to the bottom, in the forward direction with respect to the panhead 11. The slanted surface 36 of the connector portion 35 is flush with the front face 26 of the body portion 22 so that the slanted surface 36 and the front face 26 together form a flat surface 37. The flat surface of the tilting body 21 is so positioned as to be perpendicular to the length of the panning handle 31, i.e. the axis of the panning handle 31.

Figure 6:
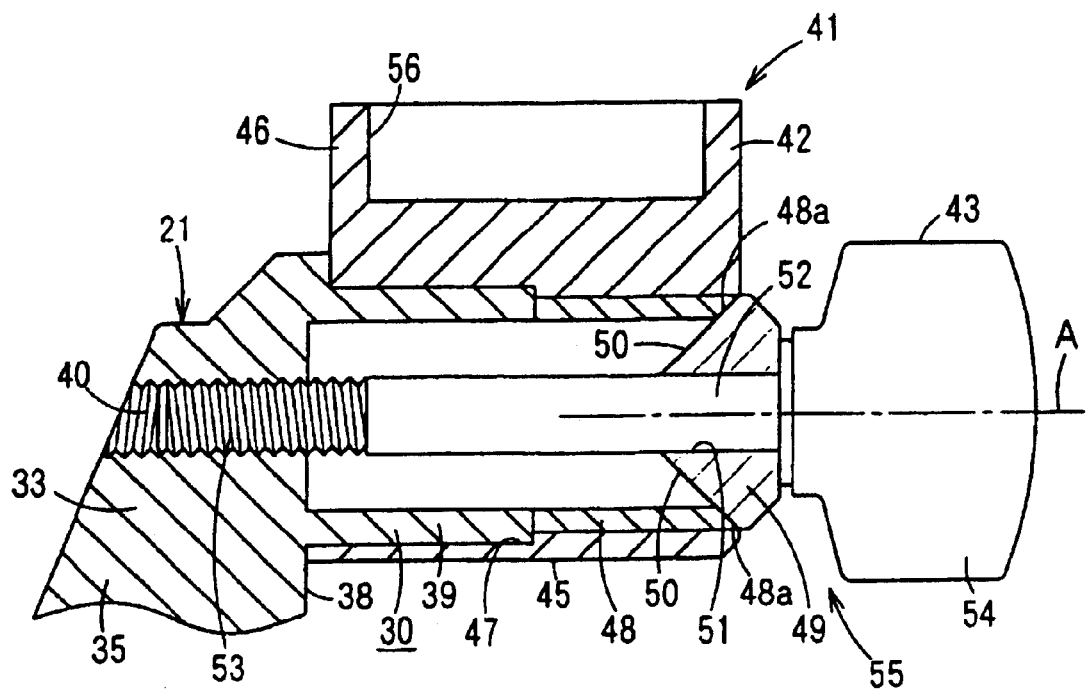
FIG. 6 is an enlarged sectional view of a part of said panhead.

The other lengthwise end of the connector portion 35, which constitutes a part of the projecting portion 33, is a vertical surface 38 having a cylindrical supporting shaft portion 39, which serves as a mounting portion. As shown in FIG. 6, the supporting shaft portion 39 is formed as an integral body with the connector portion 35 and projects from the vertical surface 38. A screw hole 40 is formed in the connector portion 35 in such a way that the screw hole 40 extends from the vertical surface 38 into the connector portion 35 and directly communicates with the inside of the supporting shaft portion 39. A cylindrical distendable member 48 is fixed, coaxially with the supporting shaft portion 39, to the outer end of the supporting shaft portion 39. The supporting shaft portion 39 and the distendable member 48 thus fixed to each other as an integral body constitute a side-tilting shaft 30.

A camera mount 41 for supporting a camera (not shown) is rotatably supported by the side-tilting shaft 30. To be more specific, the camera mount 41 is fitted around the side-tilting shaft 30 so as to be adjustably rotated around the center axis of the side-tilting shaft 30, i.e. the rotation center axis A horizontally extending in the fore-and-aft direction, within a given range, for example an area that covers a 180° arc.

As shown in FIGS. 2 and 3, the camera mount 41, which is in the shape of a generally rectangular plate and serves as a side-tilting body, is disposed so that the rotation center axis A of the camera mount 41 is located on or close to the vertical surface that extends vertically and passes the center of the lateral length of the base body 20. In other words, the camera mount 41 is disposed so that the rotation center axis A approximately coincides with the lateral-dimension-bisecting line B as viewed from the top. The camera mount 41 disposed as above can be set at the left-side tilting position, the right-side tilting position, or any other given position by being adjustably rotated.

The left-side tilting position (the left vertical position) mentioned above refers to a position where the camera mount 41 is rolled over to the left of the panhead 11 so that the top of the camera mount 41 faces leftward with respect to the panhead 11. In this position, the lengthwise direction of the camera, which is in the shape of a rectangular block and mounted on the camera mount 41, extends vertically. The right-side tilting position (the right vertical position) mentioned above refers to a position where the camera mount 41 is rolled over to the right of the panhead 11 so that the top of the camera mount 41 faces rightward with respect to the panhead 11. In this position, the lengthwise direction of the camera, which is in the shape of a rectangular block and mounted on the camera mount 41, extends vertically. The horizontal position refers to the position where the camera mount 41 is not tilted to the side, with the length wise direction of the camera extending horizontally.

The aforementioned lateral-dimension-bisecting line B of the base body 20 refers to the line that evenly bisects the lateral length of the base body 20, which is formed of the panning body 17 and the leg connecting member 15. Furthermore, the term "the rotation center axis A approximately coincides with the lateral-dimension-bisecting line B as viewed from the top" mentioned above includes the state where the rotation center axis A exactly coincides with the lateral-dimension-bisecting line B as viewed from the top.

The camera mount 41 includes a side-tilting base 42, which may be of a quick shoe type, and a side-tilt locking knob 43 serving as an operating member to be operated when fixing or disengaging the side-tilting base 42 to or from the tilting body 21. Said side-tilt locking knob 43 is capable of moving towards or away from the side-tilting shaft 30.

The side-tilting base 42 includes a fitting connector portion 45 having a generally cylindrical shape open at both ends, and a receiving platform portion 46 in the shape of a generally rectangular plate. The fitting connector portion 45 forms the lower part of the side-tilting base 42 and serves as the shaft fitting portion, while the receiving platform portion 46 forms the upper part of the side-tilting base 42. The fitting connector portion 45 and the receiving platform portion 46 are formed as an integral body.

As shown in FIG. 6, the supporting shaft portion 39 of the projecting portion 33 of the tilting body 21 is inserted and rotatably fitted in a part of the inside of the fitting connector portion 45 of the side-tilting base 42, i.e. the left-side part of the fitting connector portion 45 as viewed in FIG. 6. The side-tilting shaft 30 is positioned with the end of the supporting shaft portion 39 in contact with a stepped portion 47, which is formed along the inner surface of the fitting connector portion 45.

The distendable member 48 formed of a generally cylindrical flexible member, such as a collet, is fitted in the other part of the fitting connector portion 45. A movable member 49 serving as a stopper is fitted to one of the axial ends of the generally cylindrical distendable member 48, i.e. the outer rim of the distendable member 48. The movable member 49 is formed of a cone having a frustum-like shape or any other appropriate member.

A tapered pushing surface 50 is formed along the cylindrical outer surface of the movable member 49. An insertion hole 51 that extends in the axial direction of the supporting shaft portion 39 of the projecting portion 33 and passes through the movable member 49 is formed at the center of the movable member 49. A shaft portion 52 of the side-tilt locking knob 43 is inserted in the insertion hole 51 and the fitting connector portion 45. A threaded portion 53 at the end of the shaft portion 52 of the side-tilt locking knob 43 is screwed in the screw hole 40 of the connector portion 35 of the projecting portion 33. One end face of the distendable member 48, i.e. the outer end of the distendable member 48, is formed into a pushing-force receiving surface 48a having a tapered shape corresponding to the pushing surface 50 of the movable member 49, in other words the shape of an inwardly tapered surface. The other axial end of the distendable member 48, i.e. the inner rim, is fixed to the outer end of the supporting shaft portion 39. The shaft portion 52 of the side-tilt locking knob 43 is disposed coaxially with the side-tilting shaft 30.

When the side-tilt locking knob 43 is rotated in one direction so as to be tightened by turning a tab portion 54 of the side-tilt locking knob 43, the movable member 49 moves together with the side-tilt locking knob 43 in a given direction, i.e. to the left as viewed in FIG. 6 so as to move towards the tilting body 21.

The movement of the movable member 49 causes the pushing surface 50 of the movable member 49 to push outward the tapered pushing-force receiving surface 48a, which is formed on the distendable member 48 at a location facing the pushing surface 50, so that the corresponding axial end of the distendable member 48 flares outward. As a result, the cylindrical outer surface of the distendable member 48 is pressed against the inner surface of the fitting connector portion 45 of the side-tilting base 42 (in other words, the movable member 49 is pressed through the distendable member 48 against the side-tilting base 42), thereby fixing the side-tilting base 42 to the side-tilting shaft 30 of the tilting body 21 with the side-tilt locking knob 43 positioned therebetween. Thus, the side-tilting base 42 is locked and thereby prevented from rotating against the side-tilting shaft 30 of the tilting body 21.

When the side-tilt locking knob 43 is rotated in the other direction so as to be loosened by turning the tab portion 54, the movable member 49 moves together with the side-tilt locking knob 43 in a given direction, i.e. to the right as viewed in FIG. 6 so as to move away from the tilting body 21.

The movement of the movable member 49 releases the distendable member 48 from the pushing force of the pushing surface 50 of the movable member 49 so that the distendable member 48 returns to the original shape. As a result, the cylindrical outer surface of the distendable member 48 and the inner surface of the fitting connector portion 45 of the side-tilting base 42 are released from the press-contact with each other (in other words, the movable member 49 and the side-tilting base 42 are released from each other), so that the side-tilting base 42 is permitted to rotate against the tilting body 21. The side-tilting base 42, the movable member 49, and other relevant members constitute a fixing means 55 for fixing the side-tilting base 42 and the tilting body 21 to each other.

A housing recess 56 is formed in the top of the receiving platform portion 46 of the side-tilting base 42, and a camera securing member 57 is removably fitted in the housing recess 56. Said camera securing member 57 consists of a shoe or the like in the shape of a generally rectangular plate corresponding to the shape of the housing recess 56.

The camera securing member 57 contained in the housing recess 56 as described above is provided with a screw 59, which serves as a camera fixing screw and is attached to the center of the camera securing member 57 in such a manner that the axis of the screw 59 extends vertically. In this state, the camera securing member 57 is fixed to the side-tilting base 42 by means of a cam lever 60, which is rotatably supported by a supporting shaft 58 of the receiving platform portion 46. By rotating the cam lever 60 in a given direction around the supporting shaft 58, the camera securing member 57 and the side-tilting base 42 are released from each other. The camera securing member 57, which is attached to the back of the camera (not shown), can be fixed to the side-tilting base 42 by merely being pushed from above into the housing recess 56 of the side-tilting base 42. In other words, the camera can be mounted on the panhead 11 with a single action, without the need of rotation of the cam lever 60. The side-tilting shaft 30 is positioned approximately below the screw 59, which serves as the camera fixing screw, and extends in the fore-and-aft direction with respect to the panhead 11. The axial length of the side-tilting shaft 30 is nearly equal to the front-to-back dimension of the side-tilting base 42 of the camera mount 41.

Next, how to take a picture by a camera attached to the panhead described above mounted on a leg unit, which is a camera tripod, is explained hereunder.

After the camera securing member 57 has been removed from the side-tilting base 42 and attached to the back of the camera (not shown) with the screw 59 beforehand, the camera is mounted on the panhead 11 by snugly pushing the camera securing member 57 into the housing recess 56 of the side-tilting base 42.

The side-tilting base 42 and the tilting body 21 are then released from each other by rotating the side-tilt locking knob 43. Thereafter, together with the camera which is held by hand, the side-tilting base 42 is rotated in a given direction around the rotation center axis A, which horizontally extends in the fore-and-aft direction and coincides with the axial direction of the side-tilting shaft 30. In other words, said rotation center axis A is a straight line that extends in the fore-and-aft direction and passes through the axial center of the side-tilting shaft 30. As a result of this rotation of the side-tilting base 42, the camera is set at the horizontal position, the right-vertical position, or the left-vertical position.

By rotating the panning handle 31, the tilting body 21 and the panning body 17 are rotated to adjust their positions. Other adjustment is also performed, including adjustment of the spread angle and the lengths of the legs of the camera tripod, as well as adjustment of the height of the vertically movable support attached to the supporting shaft portion that supports the three legs of the tripod. After the direction of the camera lens is thus set at a given direction according to the subject to be photographed, the shutter of the camera is released.

Let us take as an example a case where the side-tilting base 42 is set so that the camera is in the horizontal position. The tilting body 21 may be rotated in this state in one direction (counterclockwise as viewed in FIG. 1) as shown in solid lines in FIG. 1 so that the length of the panning handle 31 and the length of the leg system 12 intersect with each other, in other words, the rotation center axis Z extending along the length of the panning handle 31 and the rotation center axis Y of the panning body 17 intersect with each other at a given angle (for example, the given angle α=60° when viewed from a side as shown in FIG. 1). Thus, the camera mount 41 is set at a given position, i.e. the first position.

In this state, the entire camera mount 41 is at a given distance from a location directly above the base body 20 in the direction in which the back of the panhead 11 faces, i.e. in the aforementioned one direction in which the panning handle 31 is projected. To be more specific, as shown by solid lines in FIG. 1, the front end of the camera mount 41 is at a given distance L1 from the rotation center axis Y of the panning body 17 of the base body 20 as viewed from the side.

Figure 7:
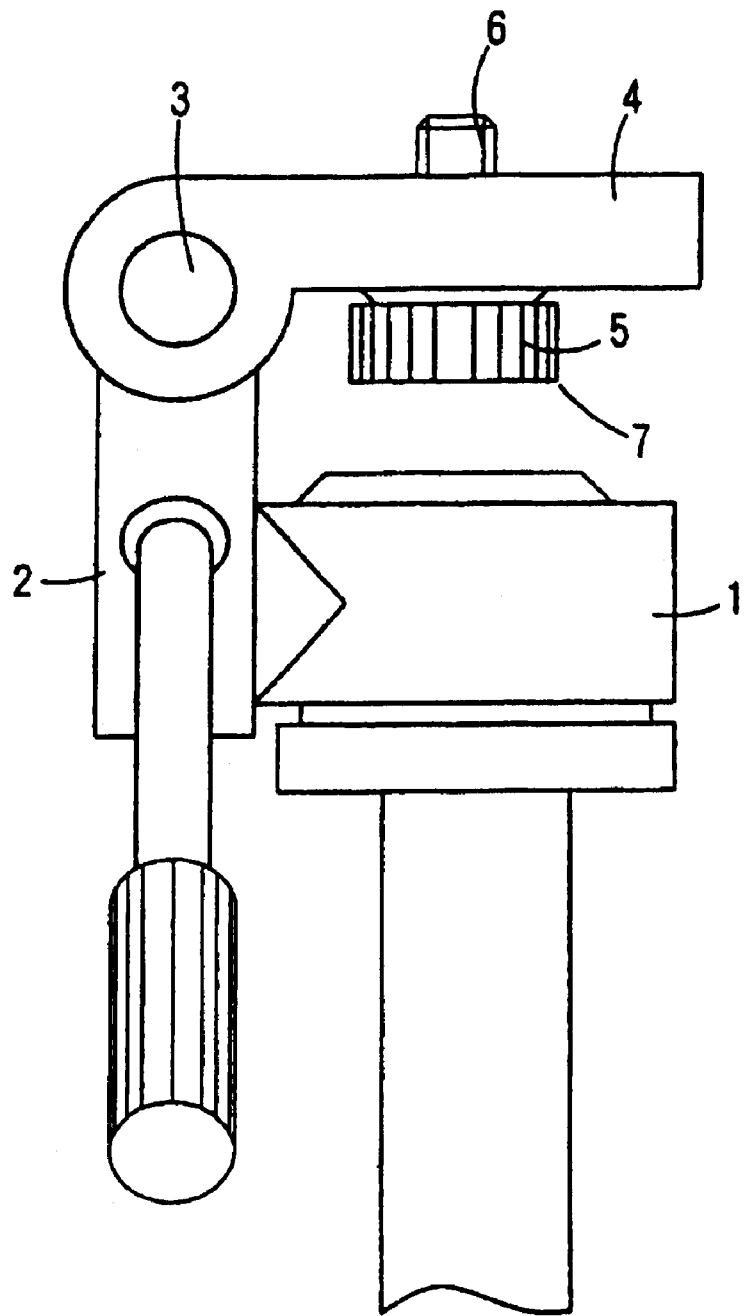
FIG. 7 is a rear view of a conventional panhead.
Figure 8:
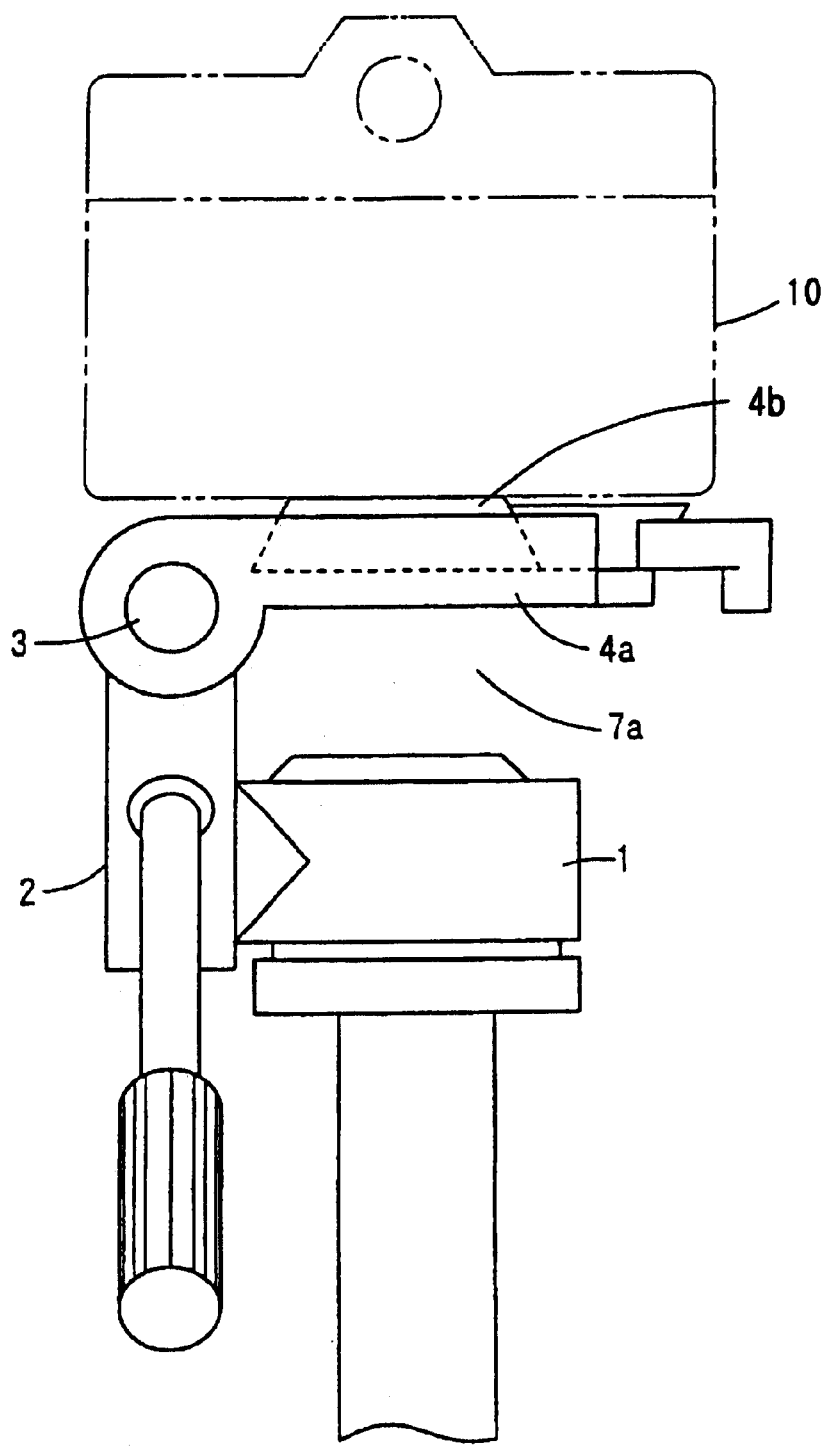
FIG. 8 is a rear view of another conventional panhead.
Figure 9:
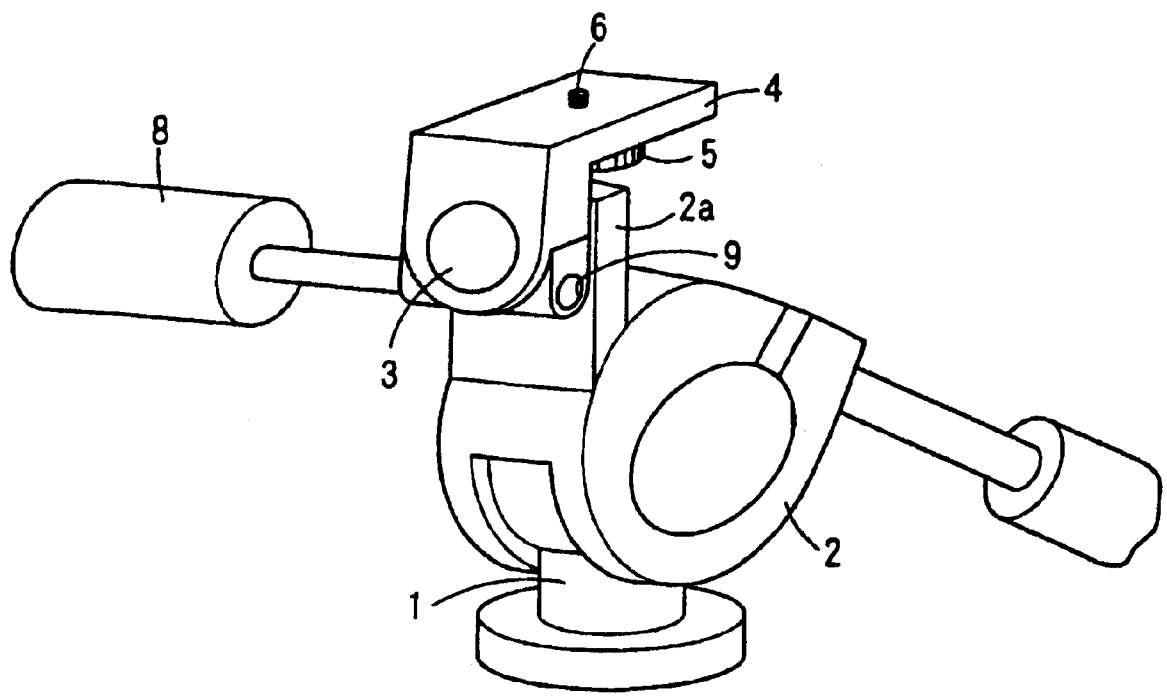
FIG. 9 is a perspective of yet another conventional panhead viewed diagonally from the front.

At least a part of the camera mount 41, for example the upper half, is located higher than the upper end portion 21a of the tilting body 21, thereby ensuring that the camera has a sufficient shooting height. Because of the projecting portion 33 projecting upward from the body portion 22 of the tilting body 21, the height of the camera securing member 57 of the camera mount 41 is greater than that of the conventional panhead shown in FIG. 7 by the distance by which the projecting portion 33 projects from the body portion 22. Said height of the camera securing member 57 is measured based on the location of the bottom end of the base body 20. The greater height of the camera securing member 57 results in greater extension of the panhead 11, thereby ensuring that the camera has a sufficient shooting height.

Pictures can be taken in this state. Thereafter, the camera mount 41 can be set at a given not-in-use position, i.e. the second position, by removing the camera from the panhead 11 and rotating the tilting body 21 in the other direction (clockwise as viewed in FIG. 1) as shown in two-dot chain lines in FIG. 1 until the lengthwise direction of the panning handle 31 and the lengthwise direction of the leg system 12 become parallel to each other, in other words, until the rotation center axis Z extending along the length of the panning handle 31 and the rotation center axis Y of the panning body 17 become parallel to each other.

In this state, the entire camera mount 41 is at a given distance from a location directly above the base body 20 in the direction in which the back of the panhead 11 faces, i.e. in the aforementioned one direction in which the panning handle 31 is projected. To be more specific, as shown by two-dot chain lines in FIG. 1, the front end of the camera mount 41 is at a given distance L2 (L2>L1) from the rotation center axis Y of the panning body 17 of the base body 20 as viewed from the side. The distance L2 may be, for example, approximately twice the distance L1.

As the camera mount 41 is maintained at a low position where the entire camera mount 41 is prevented from protruding above the flat surface 37, which forms the upper end portion of the tilting body 21. As the panhead 11 as a whole is consequently made compact, the total length of the camera tripod, on which the panhead 11 is mounted, is reduced.

As described above, according to the structure of the panhead 11, at least a part of the camera mount 41 attached to the projecting portion 33 of the tilting body 21 can be positioned above the upper end portion of the tilting body 21, or the entire camera mount 41 is positioned lower than the upper end portion of the tilting body 21 by adjustably rotating the tilting body 21 with the panning handle 31. Therefore, compared with the conventional panhead shown in FIG. 7, the panhead 11 is ensured of having a sufficient shooting height when in use and can be made sufficiently compact when not in use.

With the configuration as above, the panhead 11 according to the embodiment is capable of appropriately coping with the height of the subject to be photographed. Furthermore, compared with the conventional structure shown in FIG. 7, the panhead 11 is more convenient to carry, because it can be stowed more easily into a bag either alone or mounted on a leg system, such as a tripod. In cases where the panhead 11 according to the embodiment is left in a room either alone or still mounted on a tripod, the panhead 11 imposes fewer limitations on where it can be placed, compared with the conventional panhead shown in FIG. 7.

The panning handle 31 is positioned perpendicularly to the flat surface 37 of the projecting portion 33 of the tilting body 21. Therefore, when the panning handle 31 is positioned such that its lengthwise direction extends in parallel to the lengthwise direction of the leg system 12, the flat surface 37 of the projecting portion 33 of the tilting body 21 constitutes one of the lengthwise ends (the upper end as viewed in FIG. 1) of the leg system 12. Because of this feature, the panhead 11 can be smoothly stowed into a bag in the state it is mounted on a leg system, such as a tripod, by, for example, bringing the flat surface 37 of the panhead 11 into contact with the inner surface of the bag.

As the camera mount 41 is of a quick shoe type, there is formed a space that permits the side-tilting shaft 30 to be disposed therein, at a location approximately below the screw 59 of the camera mount 41. Furthermore, the rotation center axis A of the side-tilting base 42 of the camera mount 41 approximately coincides with the lateral-dimension-bisecting line B of the base body 20 as viewed from the top. With the configuration as above, the panhead 11 according to the embodiment described above offers benefits such that the side-tilting base 42 of the camera mount 41 can be set at either the left-side tilting position ortho right-side tilting position in accordance with the type of the camera to be mounted or other factors, and that the space in the upper front part of the panhead 11 enables the panhead 11 to be made sufficiently compact when being carried or other instances of non-use.

Therefore, regardless of whether the location of the lighting source, from which light is emitted by an electronic flash attached to the camera, is in the right part or left part of the camera, the panhead according to the embodiment is capable of constantly positioning said lighting source higher than the camera lens, thereby ensuring optimal shooting conditions. Should the light-emitting location be lower than the camera lens, various problems may arise, such as a large shadow appearing in the background.

As the camera mount 41 can easily be shifted between the left-side tilting position and the right-side tilting position by moving the side-tilt locking knob 43 back and forth and adjustably rotating the camera mount 41, the panhead according to the embodiment is more convenient to operate compared with, for example, a structure that necessitates changing the handle when changing the position of the camera mount 41.

The above explanation refers to the present embodiment, wherein the panhead 11 is intended to be mounted on a camera tripod. However, even in cases where the panhead is attached to a stand having only a single leg or a leg system having more than three legs, the panhead according to the invention is ensured of having a sufficient shooting height when in use and can be made sufficiently compact when not in use. Furthermore, the camera supported by the panhead 11 may be a variety of types, including video cameras and measuring devices that are operated similarly to a camera.

POSSIBLE INDUSTRIAL APPLICATION

As described above, a panhead according to the invention can be made sufficiently compact when being carried or other instances of non-use, and also permits its camera mount to be set at either the right-side tilting position or the left-side tilting position as desired. Therefore, the invention is particularly suitable to be applied to a panhead on which great importance is placed on portability.

I claim:
1. A panhead including:
   a camera mount provided with a camera fixing screw on the top thereof, and
   a side-tilting shaft disposed approximately below said camera fixing screw of the camera mount, wherein:
      the camera mount is supported by the side-tilting shaft so that the camera mount can be set at either the left-side tilting position, where the top of the camera mount faces leftward, or the right-side tilting position, where the top of the camera mount faces rightward, by being adjustably rotated around the side-tilting shaft.

2. A panhead including:

a base body to be connected to a leg system;

a rotational body which is provided as a part of the base body and can be adjustably rotated around a horizontal rotation center axis extending in the lateral direction;

a side-tilting shaft which is provided as a part of said rotational body and adapted to rotate in an integral body with said rotational body, and a camera mount which has a camera fixing screw at the top thereof and is attached to the side-tilting shaft so as to be adjustably rotated around a rotational center axis that horizontally extends in the fore-and-aft direction and coincides with the axial direction of the side-tilting shaft; wherein:

said camera mount is arranged such that its rotation center axis mentioned above is located on or close to a vertical surface that passes the center of the lateral length of said base body and that the camera mount can be set at the left-side tilting position, where the top of the camera mount faces leftward, or the fight-side tilting position, where the top of the camera mount faces rightward, by being adjustably rotated; and said side-tilting shaft is disposed approximately below the camera fixing screw of the camera mount.

3. A panhead as claimed in claim 1 or claim 2, wherein the panhead also includes:

a side-tilt locking knob which extends coaxially with the side-tilting shaft and is capable of advancing or retreating with respect to the side-tilting shaft, and a stopper adapted to function such that when said side-tilt locking knob is at the advanced position the stopper is pressed against the camera mount so as to prevent rotation of the camera mount, and when the side-tilt locking knob is at the retreated position the stopper is released from the camera mount so as to permit rotation of the camera mount.

4. A panhead as claimed in claim 1 or claim 2, wherein:

the axial length of the side-tilting shaft is nearly equal to the front-to-back dimension of the camera mount, and a shaft fitting portion fitted to said side-tilting shaft is formed at the underside of the camera mount.

5. A panhead as claimed in claim 3, wherein:

the axial length of the side-tilting shaft is nearly equal to the front-to-back dimension of the camera mount; and a shaft fitting portion fitted to said side-tilting shaft is formed at the underside of the camera mount.

* * * * *

UNITED STATES PATENT AND TRADEMARK OFFICE
CERTIFICATE OF CORRECTION

PATENT NO. : 6,644,871 B2
DATED : November 11, 2003
INVENTOR(S) : Kouichiro Nakatani It is certified that error appears in the above-identified patent and that said Letters Patent is hereby corrected as shown below:

Column 2,
Line 21, change "fight" to -- right --.

Signed and Sealed this

Twenty-fifth Day of May, 2004

JON W. DUDAS
*Acting Director of the United States Patent and Trademark Office*